Nov. 11, 1941.  O. HOLM-HANSEN  2,262,498
COOKING APPARATUS
Filed Dec. 14, 1939  2 Sheets-Sheet 1
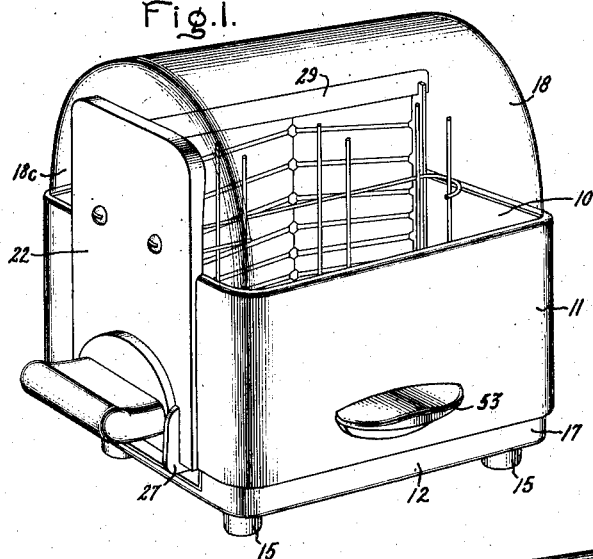
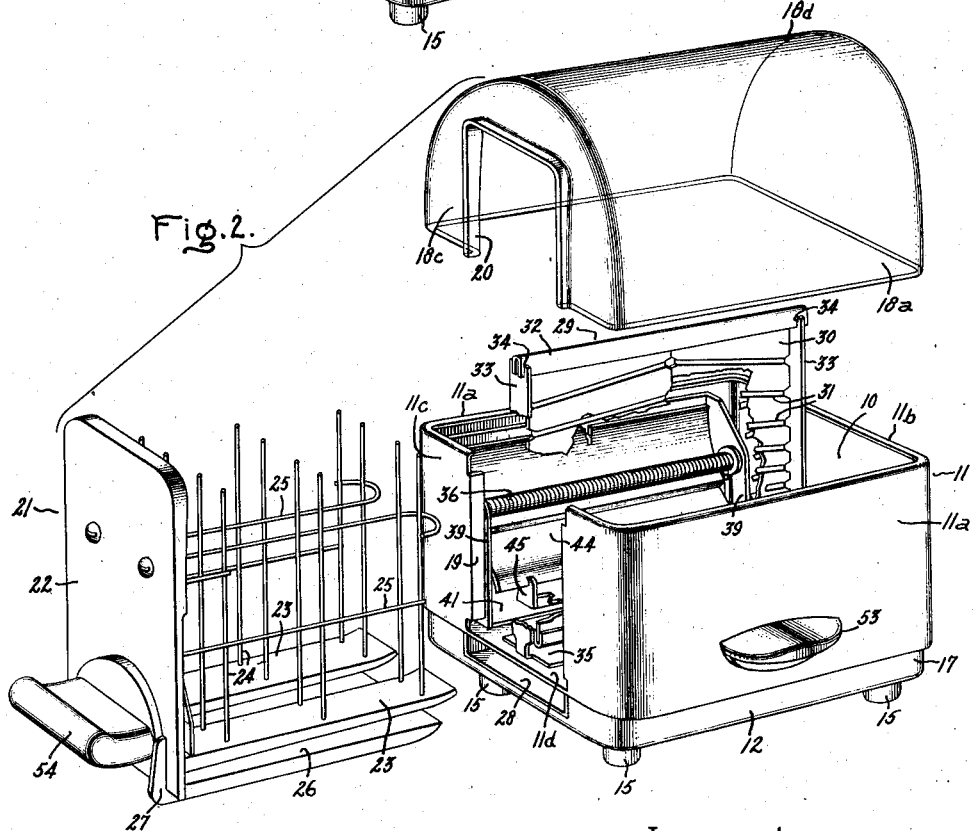
Inventor:
Osmund Holm-Hansen,
by Harry E. Dunham
His Attorney.

Nov. 11, 1941.    O. HOLM-HANSEN    2,262,498
COOKING APPARATUS
Filed Dec. 14, 1939    2 Sheets-Sheet 2
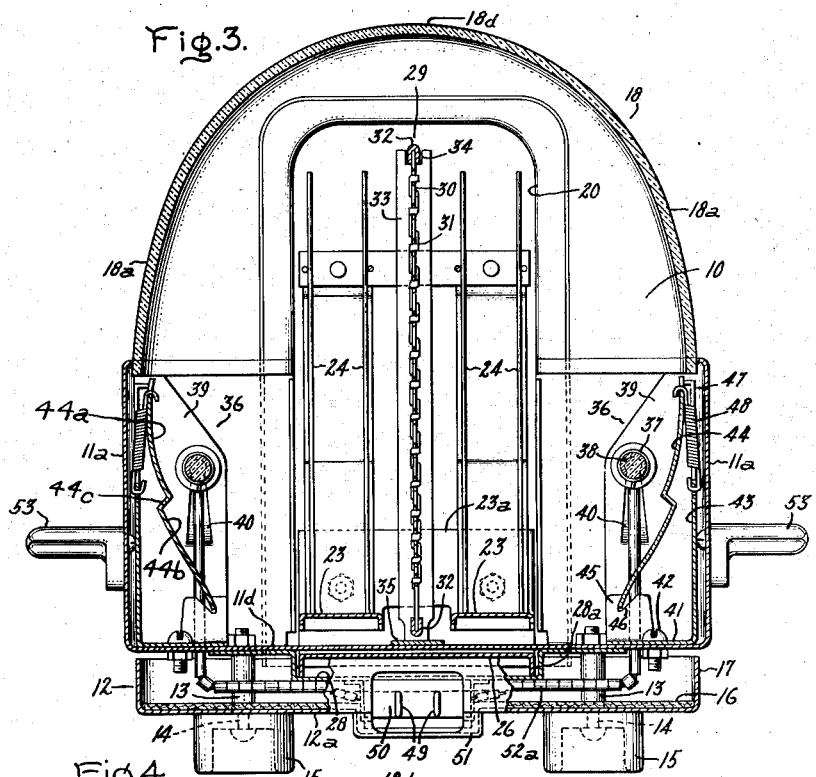
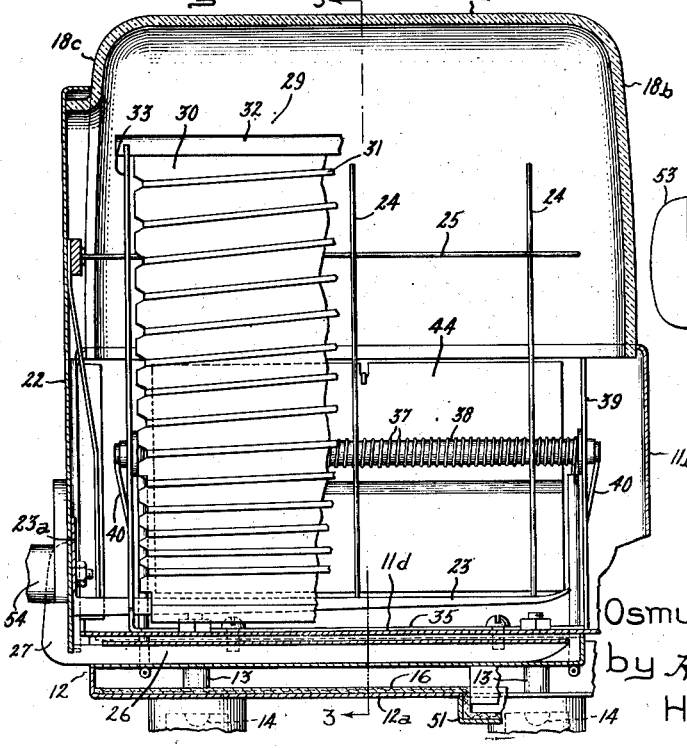
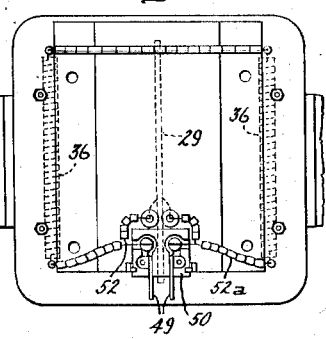
Inventor:
Osmund Holm-Hansen,
by Harry E. Dunham
His Attorney.

Patented Nov. 11, 1941

2,262,498

UNITED STATES PATENT OFFICE 2,262,498

COOKING APPARATUS

Osmund Holm-Hansen, Stratford, Conn., assignor to General Electric Company, a corporation of New York Application December 14, 1939, Serial No. 309,228

10 Claims. (Cl. 219—19)

This invention relates to cooking apparatus, more particularly to toasters, and it has for its object the provision of a toaster having a simplified construction and which will perform a highly efficient toasting operation, and moreover, which is constructed and arranged so that the slice may be viewed as it is being toasted.

In accordance with this invention, the toaster is provided with transparent walls. In one form of this invention the transparent walls are in the form of a dome covering the toasting space. The toasting space is provided with opaque walls below the dome, and housed within these walls so as to be substantially concealed by them are suitably spaced heating means. The slices are supported in the toasting space so that they may be viewed through the transparent dome, and also so that heat rays are imparted to the slices from the concealed heating means. In case it is desired to toast several slices of bread at a time, an additional heating element will be located between the spaced heating means so as to define a plurality of toasting spaces, and which functions to toast the inner sides of the bread slices inserted within these spaces.

This invention also comprises novel means for holding the bread slices and for moving them into and out of the toasting spaces.

The construction and arrangement of the toasting chamber, heating means, and slice supports are simple, inexpensive, and compact, and the organization of these elements presents a pleasing appearance.

For a more complete understanding of this invention, reference should be had to the accompanying drawings in which Fig. 1 is a perspective view of an electric toaster arranged in accordance with this invention; Fig. 2 is an expanded perspective view of the toaster of Fig. 1, parts being broken away so as to illustrate certain details of construction; Fig. 3 is an enlarged vertical sectional view taken through the line 3—3 of Fig. 4; Fig. 4 is an enlarged vertical longitudinal sectional view; and Fig. 5 is a bottom plan view with parts removed so as to illustrate certain details of construction, Fig. 5 being made on a reduced scale as compared with Figs. 1 to 4.

Referring to the drawings, this invention has been shown as applied to an electric toaster having a heating or toasting chamber 10. The toasting chamber 10 at the bottom is defined by lower walls 11 formed of some suitable opaque material; preferably, they will be formed of a suitable sheet metal, such as steel. Also, it is preferable that the walls 11 be shaped to define a chamber having a substantially rectangular horizontal cross-section, although they may form a chamber having any suitable cross-section; as shown, the walls 11 comprise a pair of oppositely positioned side walls 11a, an end wall 11b and a front wall 11c. These walls are secured to the periphery of a bottom wall 11d in any suitable manner, as by welding. The assembly of the side, end, front and bottom walls is mounted upon a suitable base 12. The base 12, as shown more clearly in Figs. 3 and 4, is provided with a bottom wall 12a which is spaced from the bottom wall 11d by means of suitable spools 13 and to which it is secured by means of screw fastening means 14 directed through the spools, as clearly shown in Figs. 3 and 4. The screw fastening means 14 are also utilized to clamp suitable feet 15 to the base. The feet 15 are formed of some suitable material having a poor heat conductivity, such as a suitable phenol formaldehyde condensation product. Likewise, the spools 13 will be formed of a material that is a poor conductor of heat, such as a suitable porcelain. Preferably, the bottom wall 12a will be covered with a poor heat conducting sheet 16 which may be made of asbestos. Also, it is preferable that the outer edges of the bottom wall 12a be provided with an upright wall 17, as shown, which substantially closes the space between the bottom wall 12a and the bottom wall 11d at the edges.

The toasting chamber 10 is completed by a dome 18 which covers the area bounded by the walls 11a, 11b and 11c, as clearly shown in the drawings. The dome 18 has side walls 18a, an end wall 18b, a front wall 18c and a top wall 18d which merges into the two side walls 18a, as shown. All of the walls of the dome are formed integrally with each other, and all are formed of a suitable transparent material, such as heat-resistant glass. One glass now on the market which is suitable for the dome is known as "Pyrex."

As shown, the front wall 11c of the lower walls 11 is provided with an opening 19, and the front wall 18c of the dome 18 is provided with an opening 20, these two openings being aligned with each other so as to define an elongated vertical front opening through which bread slices are movable into and out of the toasting chamber 10. A suitable slice support 21 is provided for holding the slices in their proper toasting positions in the toasting chamber 10. This support 21 comprises a front wall or panel 22 which is arranged to close the front opening when the slices are in their toasting positions. The slice holder further comprises a pair of slice supports 23 which are rigidly secured at the front to the panel 22 in spaced relation crosswise, as clearly shown in Fig. 2. As shown more clearly in Fig. 4, these members 23 are provided with an upright section 23a at the front which is secured to the panel 22 in any suitable manner, as by welding. Each support 23 is provided at its outer sides with vertical wires 24 spaced apart longitudinally of the support and which are secured together by transverse wires 25. It will be understood that these spaced wires function to receive the slices (not shown) and hold them vertically within the toasting chamber 10. The slice holder 21 is further provided with a channel-like guide member 26 spaced below the supports 23 and in substantially parallel relation with them. The channel is rigidly secured at its forward end to the lower end of the panel 22; for this purpose, the channel is provided at its forward end with upright arms 27 which are secured to the panel 22 in any suitable manner, as by welding. A suitable channel-like member 28 for receiving the channel guide 26 is provided below the bottom wall 11b of the heating compartment 10 in the space between this bottom wall and the wall 12a of the base. As shown more clearly in Fig. 3, the channel 28 has lateral flanges 28a at its upper edges which are secured to the bottom wall 11d in any suitable manner, as by welding. It will be understood that when the guide 26 is inserted in the channel 28 and the holder 21 pushed inwardly, the supports 23 will be projected into the toasting chamber above the bottom wall 11d and guided into their proper toasting positions.

Suitable means are provided in the heating chamber 10 to apply heat to the inner and outer sides of the bread slices supported on the members 23. In order to apply heat to the inner surfaces of the bread slices a central heating element 29 is provided. This central element 29 is formed of sheet-like supports 30 formed of any suitable electrically insulating material, such as mica, and upon which are wound suitable resistance conductors 31. The electrically insulating sheets 30 are bounded at the top and bottom edges by metallic channels 32. The upper channel 32 is supported at its ends by upright arms 33 which at their upper ends are provided with slots 34 that receive the ends of the channel 32 so as to support the insulating sheets 30 with their resistance conductor 31 thereon in an upright position, as clearly shown in the drawings. The arms 33 are secured at the bottom to a transverse member 35 which is rigidly secured to the bottom wall 11d in any suitable manner, as by welding. It will be understood that the resistance conductor 31 will be wound on both sides of the sheets 30 so that it will impart heat to the inner surfaces of both slices placed on the supports 23.

Suitable heating means 36 spaced laterally from the central heating element 29 apply heat to the outer surfaces of the bread slices. The heating means 36 are constructed and arranged so as to be concealed by the opaque walls 11. Each heating means 36 comprises a resistance conductor 37 spirally wound upon a rod 38 formed of a suitable electrically insulating material, such as porcelain. The ends of the rod 38 are mounted in supporting brackets 39 which are provided with apertures that receive the ends of the rod. The rod is held in position in the brackets by means of stops 40 on the brackets engaging the ends of the rod; these stops preferably will be and as shown are formed of the material of the brackets, the brackets being cut or slit to provide the stops which are forced outwardly from the plane of the brackets, as clearly shown in Figs. 3 and 4. The brackets 39 at their lower ends are attached to a transverse plate 41 which is secured to the bottom wall 11d in any suitable manner, as by screw-fastening means 42. Also connected to the brackets is an outside vertical wall 43. Mounted between this wall and the heating means defined by the resistance 37 and the rod 38 is a suitable heat-reflecting member 44 constructed and arranged to project heat rays generated by the heating means upwardly and outwardly so as to uniformly distribute them over the adjacent area of a bread slice placed on the adjacent support 23. As clearly shown in Fig. 3, this reflecting member is formed of two sections 44a and 44b joined by a section 44c. The first section 44a is concave and is placed directly back of the heating element, and the second section 44b is slightly convex. This arrangement of the reflecting surface distributes the heat rays generated locally by the rod-like heating element uniformly over the adjacent area of the slice. While this reflector may be formed of any suitable material, it preferably will be made from aluminum. The heat reflector 44 is supported on upright tabs 45 on the transverse plate 41; as shown in Fig. 2, these tabs 45 are blanked from the material of which the member 41 is made and are bent upwardly at right angles to this member. Each tab 45 is provided with a notch 46 which receives the lower end of the reflector, as clearly shown in Fig. 3. The upper end of each reflector rests against a stop 47 provided for it on the upper end of the vertical wall 43, and the reflector is held in its position in the notches 46 and against the stop 47 by means of a tension spring 48, which has its upper end anchored to the upper edge of the reflector and its lower end anchored to the wall 43.

The heating elements 29 and 36 are supplied by electrical supply terminals 49 mounted in the base 12. The supply terminals 49 are mounted directly in a block 50 formed of any suitable electrically insulating material, such as porcelain, or phenol formaldehyde condensation product, and this block in turn is mounted in a depression or well 51 provided in the bottom wall of the base 12, as shown in Figs. 3 and 4. The sheet of asbestos 16 preferably will line the bottom wall of the well 51, as clearly shown in Figs. 3 and 4. Electrical supply leads 52 are connected with the terminals and with the heating elements 29 and 36 so as to connect the elements 36 in series, and these two elements in parallel with the element 29, as clearly shown in Fig. 5. The leads 52, as shown, are housed within the base 12 and are electrically insulated by insulating beads 52a formed of any suitable material, such as porcelain.

The brackets 39, in addition to their duties of supporting the heating elements 37 and 38 and their reflectors 44, also function as supports for the dome 18. As shown, the lower edge of the dome extends downwardly into the wall 11 and rests directly upon the brackets 39 at the corners. The walls 11 are resilient and yieldingly engage the lower portions of the walls of the dome so as to hold the dome in place on the brackets 39.

The side walls 11a are provided with handles 53, while the panel 22 at the front is provided with a handle 54. These handles are both made from material with low heat conductivity, such as a heat resistant phenol formaldehyde condensation product.

It will be understood that in the operation of the device, the panel 22 with the support 23 will be withdrawn so that the bread slices may be placed upon the supports 23, and then will be replaced to insert the supports 23 into the heating chamber, the channel guide 26 guiding the supports 23 with the slices thereon into their proper toasting positions with relation to the heating means 29 and 36. If now the heating means are energized, the bread slices will be toasted, and the progress of the toasting operation may be viewed through the transparent dome 18. It will be observed that substantially the entire surfaces of the bread slices may be viewed through this dome. The outer heating elements 36 are concealed by the opaque walls 11 and there is nothing to obstruct the view of the outer surfaces of the bread slices. When the slices have been toasted to the desired degree the panel 22 is withdrawn to move the slices out of the toasting chamber.

It is to be understood that while the toaster has been shown as provided with means for heating two slices simultaneously that it may be constructed to toast more than wo slices simultaneously. Moreover, it may be constructed to toast but a single slice at a time. In this case only the two outside heating elements will be used, and but a single support 23 will be provided to hold the single slice in proper toasting relation with the two outside heating elements.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A toaster comprising a toasting chamber having a bottom wall and an end wall provided with a vertical opening into which slices can be inserted and withdrawn, heating means within said chamber positioned to define a toasting space, a base for said chamber spaced below its bottom wall, said bottom wall closing said toasting space to the space below it, a slice holder having a slice holding portion movable through said vertical opening to carry a slice into and out of said toasting space, and also having a guide portion spaced below said holding portion and movable into said space below said bottom wall, and guide means within said space cooperating with said guide portion so as to guide said slice holding portion in its movement into and out of said toasting chamber.

2. A toaster comprising a base, a heating chamber mounted on said base having a bottom wall spaced from the base, a channel located within the space between said base and said wall, said heating chamber having a vertical opening through which a slice is movable into and out of said chamber, and a slice support having a panel arranged to close said opening and a slice holder secured to said panel projecting from it so that it holds a slice in toasting position when said panel is in its position to close said opening, and said holder also having an elongated guide member secured to said panel below said holder and constructed and arranged to be slidably received in said channel to guide said holder into and out of said chamber.

3. A toaster comprising a base, a heating chamber mounted on said base having a bottom wall spaced from the base, and the base having a marginal wall to substantially close said space at the edges of said chamber, a channel located within said space and projecting through said wall, said chamber having a vertical opening through which a slice is movable into and out of said chamber, and a slice support having a panel arranged to close said opening and a slice holder secured to said panel projecting from it so that it holds a slice in toasting position when said panel is in its position to close said opening, and said holder also having a guide secured to said panel below said holder and constructed and arranged to be slidably received in said channel to guide said holder into and out of said chamber.

4. An electric toaster comprising walls defining a heating chamber, the lower portion of said walls being opaque and the upper portion of said walls being transparent, means for supporting a slice to be toasted in said chamber so that unobstructed view of said slice can be had through said transparent wall portion, a rod-like heating element to heat the adjacent surface of said slice positioned within the lower part of said chamber opposite the opaque portion of said walls so as to be concealed thereby, and a heat reflector in the lower part of said chamber opposite said opaque portion of said walls so as to be concealed thereby and located between said heating element and said opaque portion, said reflector being formed with a concave section back of said rod-like heating element and a convex section below said concave section, said sections being constructed and arranged to reflect the heat generated locally by said heat generating element upwardly and outwardly substantially uniformly from said adjacent surface.

5. An electric toaster comprising a base, a vertical metallic resilient wall mounted on and rising upwardly from said base, a transparent dome covering the area bounded by said metallic wall having its lower edge in overlapped relation with said metallic wall, supporting means engaging said lower edge to support said dome, and said resilient wall yieldingly engaging said lower edge to hold said dome in assembled relation with it.

6. An electric toaster comprising a bottom wall, a vertical opaque wall at the periphery of said bottom wall having a vertical opening therein at the front, a vertical heating element extending from the front to the rear defining a pair of toasting spaces on each side, heating means on the outsides of said spaces concealed by said opaque wall, a transparent dome covering said spaces, and having an opening aligned with said opening in said opaque wall, the two openings defining a passageway through which slices can be moved into and out of said toasting spaces, a separable slice holder having a panel adapted to close said openings and a pair of slice supports projecting from said panel into said toasting spaces, the panel also having an elongated guide below said bottom wall, and said bottom wall having means slidably receiving said guide to lead the slice supports into and out of said toasting spaces.

7. An electric toaster comprising a bottom wall, a vertical opaque wall at the periphery of said bottom wall having a vertical opening therein at the front, a vertical heating element extending from the front to the rear defining a pair of toasting spaces on each side, a transparent dome covering said spaces having an opening cooperating with said first-named opening to form a passageway through which slices are movable into and out of said toasting spaces, heating elements at the outer sides of said toasting spaces, each having supports at the front and rear, an elongated rod-like heating element extending from the front to the rear having its ends mounted in said supports, a reflector mounted outside of said heating element constructed and arranged to reflect the heat rays generated by said element upwardly and inwardly substantially uniformly over the outer surfaces of slices in said toasting spaces, and the lower edges of said dome supported by said supports.

8. A toaster comprising a heating chamber having lower metallic walls, a transparent dome covering the area bounded by said walls having its lower edge received by said walls, a support housed by said lower walls upon which said dome rests, and said walls being formed of a resilient material that yieldingly engages said lower edge so as to secure said dome in its position on said support.

9. A toaster comprising a heating chamber, means for supporting a bread slice in said chamber, means for heating one side of said slice including a heat generating element, brackets supporting said heat generating elements, a reflector back of said heat generating element for reflecting heat rays therefrom onto said side of said slice, said brackets being provided with notches in which the lower edge of said reflector is received, and means for anchoring the upper edge of said reflector to said brackets.

10. A toaster comprising a heating chamber, means for supporting a bread slice in said chamber, a pair of brackets on one side of said chamber at its ends, a member extending between and supporting said brackets removably mounted on said base, a heating element extending between said brackets, means connecting the ends of said heating element to said brackets, a reflector back of said heating element having the ends of its lower edge received in notches provided for them in said brackets, and a spring connecting the upper edge of said reflector to said member.

OSMUND HOLM-HANSEN.